United States Patent [19]

Cadawas

[11] 4,423,501

[45] Dec. 27, 1983

[54] PHONOGRAPH TONE ARM SUSPENSION

[76] Inventor: Thomas L. Cadawas, 92 Onedia Ave., Staten Island, N.Y. 10301

[21] Appl. No.: 257,943

[22] Filed: Apr. 23, 1981

[51] Int. Cl.³ .............................................. G11B 17/02
[52] U.S. Cl. .................................................... 369/253
[58] Field of Search ........................................ 369/253

[56] References Cited

FOREIGN PATENT DOCUMENTS

| | | | |
|---|---|---|---|
| 824701 | 11/1951 | Fed. Rep. of Germany | 369/253 |
| 1007074 | 4/1957 | Fed. Rep. of Germany | 369/253 |
| 2042479 | 3/1972 | Fed. Rep. of Germany | 369/253 |

Primary Examiner—Steven L. Stephan
Attorney, Agent, or Firm—Bruce M. Collins

[57] ABSTRACT

A phonograph tone arm suspension system in which the cantilevered tone arm is supported by a resilient member. First and second attachment means are provided for the resilient member on the tone arm and on a vertical support member, respectively, which attachment means are positionally adjustable so as to permit variation in the vertical component of the supporting resilient member and in the vertical compliance of the tone arm.

6 Claims, 5 Drawing Figures

PHONOGRAPH TONE ARM SUSPENSION

This invention pertains to an improvement in suspension systems for phonograph tone arms.

Tone arm pivot and bearing designs generally fall into one of several commonly used categories—the unipivot, double-gimbal, knife-edge, or cylindrical pivot and bearing design. In each of these designs, the tone arm has the capability of pivoting about the vertical axis (for movement across the record during use) and about a horizontal axis (both for addressing the record and following the record vertically during use).

Because of the cantilevered nature of the tone arm, it is necessary to provide some type of opposing force to minimize the effective weight of the needle on the record. Early in the development of "talking-machines", it was proposed to provide this force through the use of a spring, the tension of which could be adjusted through the use of various screw devices (see, e.g., U.S. Pat. Nos. 1,282,007 and 1,284,988). Similar arrangements have been suggested for recording heads (see U.S. Pat. No. 2,643,886). While the incorporation of a spring as a counter-balancing device has been suggested with pick-up tone arms of more modern designs (see, e.g., U.S. Pat. Nos. 2,665,919 and 3,120,313), the majority of tone arm suspension systems supplement or replace the spring with a weighted counter-balance (see, e.g., U.S. Pat. Nos. 1,866,403, 2,357,034, 2,551,506, 3,776,557, 3,815,925 and 3,294,403).

Because the mass of a tone arm must be matched to the compliance of the pick-up, it has also been suggested that all tone arms should be provided with means for adjusting its effective mass. A low mass tone arm can thus cause mistracking, distortion and record damage when used with a pick-up of improper compliance. Conversely, a high mass tone arm will alter the character of the reproduced sound, generating a heavy bass and altering the feedback sensitivity of the system. One worker has suggested the incorporation of a simple sliding weight on the tone arm which, depending upon its position would either increase or decrease the mass of the tone arm. The same effect could be obtained by an adjustable counter-balance.

The present invention provides a tone arm suspension system which eliminates entirely the counter-weight of conventional tone arms. At the same time, the present suspension system provides means for a matching or adjustment of differences in pick-up mass and cantilever compliance. Utilization of the present system thus permits precise adjustment of the vertical tracking force and effective pick-up mass so that virtually any type of pick-up unit can be accommodated. As a result, the system minimizes stylus and record wear, eliminates spurious resonances due to poor pick-up at the tone arm interface and virtually eliminates mistracking caused by high frequency flutter. In contrast to existing systems in which the vertical compliance of the tone arm is relatively constant and a pick-up must be matched to it, the capability of varying the compliance of the present tone arm over a wide range permits the use of virtually any pick-up device.

The nature of the invention will be more clearly seen from the drawings in which.

Figure 1:
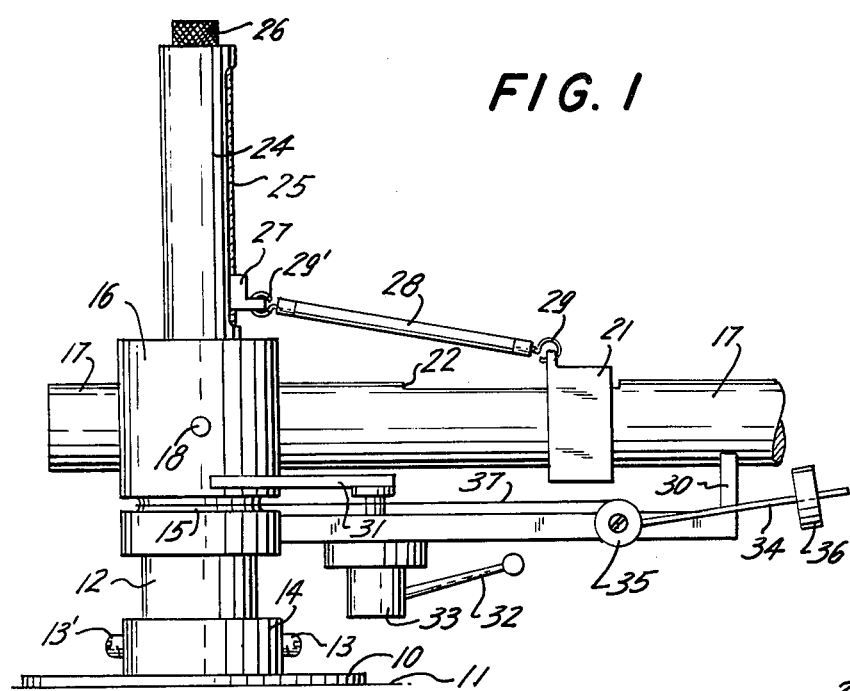
FIG. 1 is a front elevation of the tone arm suspension system showing the compliance adjustment means in one position.
Figure 2:
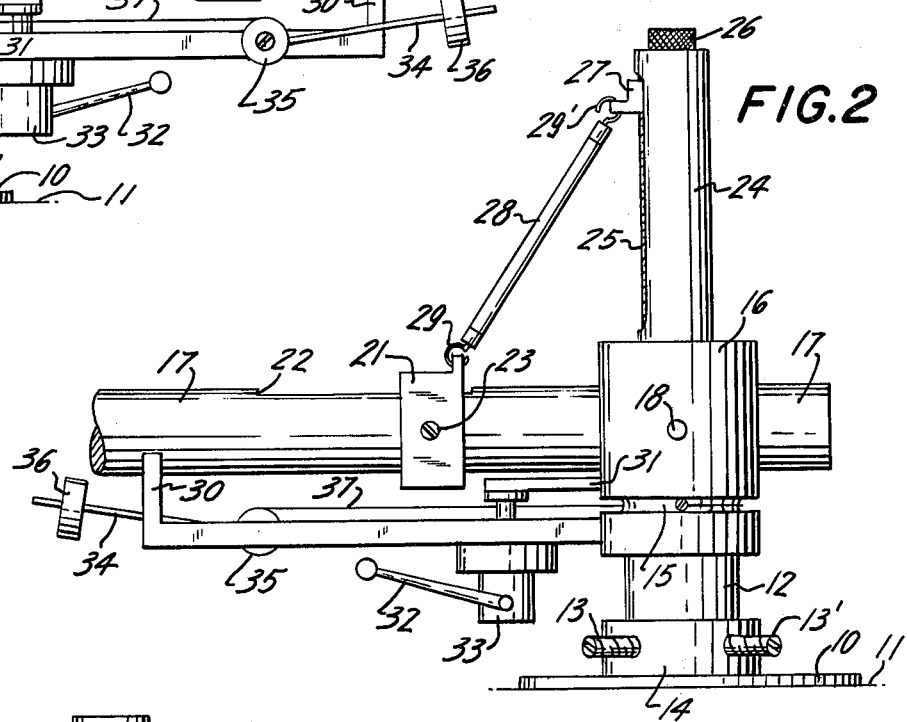
FIG. 2 is a rear elevation of the system shown in FIG. 1 with, however, the compliance adjustment means in a different setting.

Referring now in greater detail to FIGS. 1-4, there is provided a base 10 which is adapted for rigid mounting on the upper surface of the turntable enclosure 11, and which carries support member 12. Set screws 13 and 13' permit rotational adjustment of support member 12, relative to collar 14, after which a tightening of the set screws fixes support member 12 in the desired position.

Pivotably mounted on support 13 is tone arm yoke 16 which has a slightly concave indented extension 15, which serves as a pulley, developed on its lower surface. The tone arm yoke 16 is rotatably mounted through extension 15 on support member 12 for rotation about a vertical axis. The tone arm 17 is in turn pivotably mounted on shaft 18 for pivotable movement about a horizontal axis. Tone arm 17 can thus rotate relative to the base 10 (and thus the turntable) about both a vertical and horizontal axes.

Figure 4:
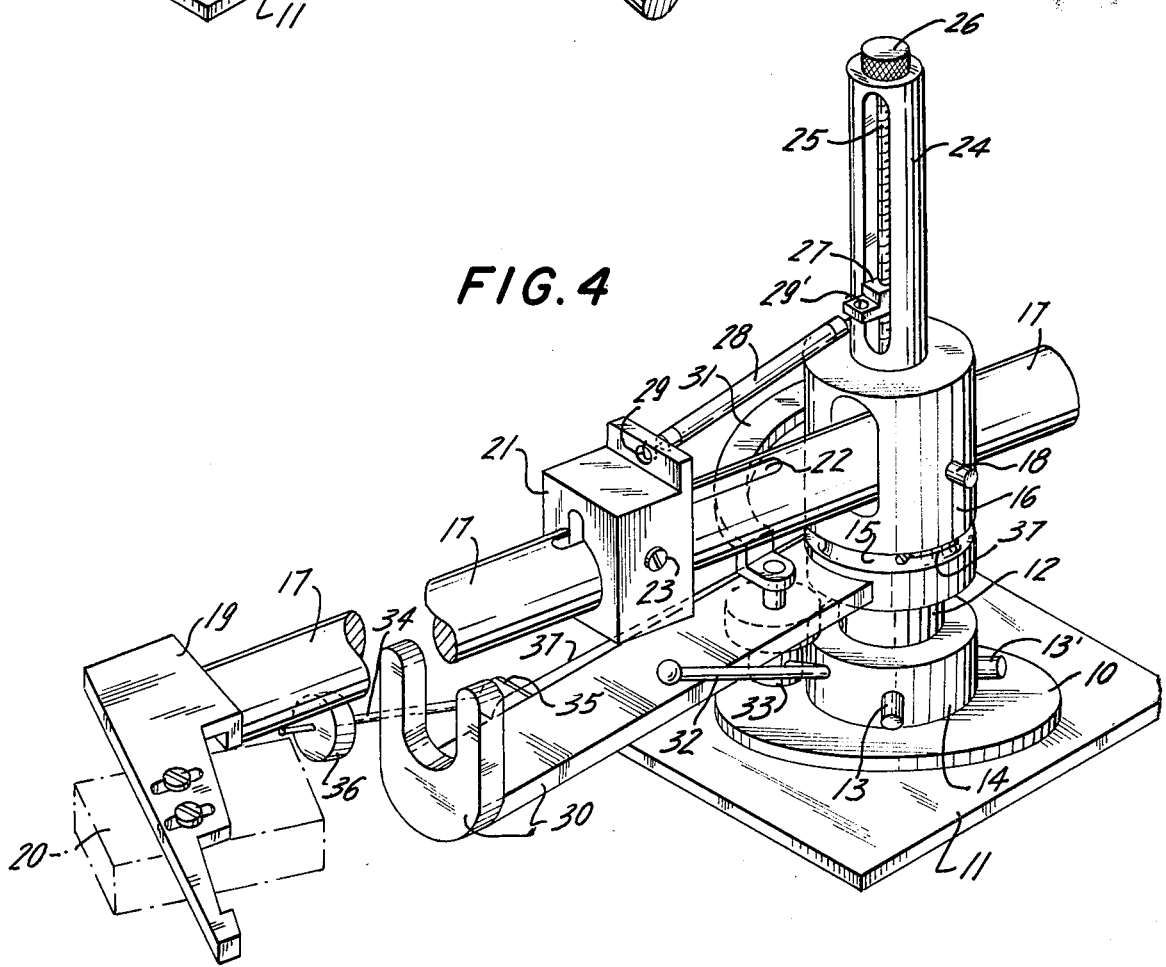
FIG. 4 is a different prospective view of the device shown in FIG. 2 with, however, the compliance adjustment means being in a position intermediate to that shown in FIGS. 1 and 2.

As shown in FIG. 4, tone arm 17 terminates in a cartridge holder 19 which can be of any suitable, conventional design suitable to receive a variety of pick-up cartridges (shown in dotted line as 20).

Disposed on tone arm 17 is a first attachment mean which in this embodiment takes the form of collar 21 and which is positionally adjustable along the main longitudinal axis of the tone arm 17. Tone arm 17 may thus be provided with a groove 22 (shown in FIGS. 3 and 4) to which first attachment means 21 is keyed. In addition there may be provided a locking screw 23 (shown in FIGS. 2 and 4) in order to fix the first attachment means at any desired position long a defined portion of tone arm 17.

Extending upwardly from yoke 16, and rotatable with yoke 16 about the vertical axis of rotation, are second attachment means. In the embodiment shown, this includes an adjustment mechanism 24 carrying a rotatable threaded member 25 (shown in FIGS. 3 and 4), an adjustable knob 26 for rotation of threaded member 25, and carriage 27 which is threaded to receive and ride on screw 25 and which advances up or down within the adjustment mechanism 24 as knob 26 is rotated.

Removably connected to the collar 21, which constitutes the first attachment means, and to the adjustment mechanism 24, which constitutes the second attachment means, is an elongated resilient member 28. The resilient member may be fabricated from a number of materials including rubber, various plastics and, most preferably, silicone rubber. Hooks 29 and 29' are attached to each end of the elongated member 28, as by crimping, each of hooks 29 and 29' being adapted to engage collar 21 of the first attachment means and carriage 27 of the second means, respectively.

The track of collar 21 along tone arm 17 (as defined for example by the length of groove 22), the distance through which carriage 27 may move along screw 25, and the length of resilient member 28 are selected so that the tone arm 17 may pivot about shaft 18 to the extent that the needle (not shown) on pick-up 20 comes into functional contact with a phonograph record. The moment developed by tone arm 17 is thus opposed by the elasticity of resilient member 28. The effective mass of the tone arm accordingly can be modified and adjusted to the point at which it is optimum for the specific components of a given system.

In addition, however, the vertical compliance of the tone arm (as measured at the needle of the pick-up cartridge) can be varied for any given effective mass of the tone arm. Thus by advancing carriage 27 to the lowest possible position and positioning collar 21 at a point most distal from yoke 16, as shown in FIG. 1, the vertical component (vector) of the resilient member 28 is at a minimum and the vertical compliance of the tone arm is at a maximum. Conversely, by raising carriage 27 to its highest position and moving collar 21 to a position more proximate to yoke 16, the vertical component of resilient member 28 is increased and the system will demonstrate a lower degree of vertical compliance. The flexibility in altering the compliance which the present system thus provides is extremely important since it permits the use of a wide variety of pick-up cartridges having different optimum compliance requirements, as well as the capability of precise adjustment of the compliance.

It has also been found that this system provides excellent damping, the pick-up cartridge and needle being almost completely unaffected by external vibrations when the system is properly balanced and adjusted.

In order to minimize fatigue of resilient member 28 when the tone arm is not in use, there may also be provided a support arm 30 adapted to receive tone arm 17 in such a position as to eliminate tension on resilient member 28. Support arm 30 also may be provided with a cueing mechanism including cueing bar 31, cueing lever 32 and gearing mechanism 33.

It is conventional to provide phonograph tone arms with means to prevent or reduce skating, namely, undesirable movement of the tone arm across the grooves of a record during play. It has been found that the present device demonstrates substantially no tendency to skate when properly adjusted (and when the entire system is properly balanced). Consequently, the inclusion of an anti-skating device is unnecessary. Nevertheless, it has been found that the incorporation of a mechanism heretofore utilized as an anti-skating device can advantageously be incorporated into the present mechanism in order to permit adjustment of the lateral or horizontal compliance (as well as adjustment of the vertical compliance, discussed above). Such a device can include a spoke 34 extending from hub 35, which is rotatably mounted on support arm 30, a counter-balance 36 slidably mounted on spoke 34 and an opposed wire or line 37, one end of which is attached to hub 35 and the other end of which passes around pulley 15 and is secured to yoke 16 by anchor (shown in FIG. 2). Depending upon the position of counter-weight 36 on yoke 34, various moments can be developed relative to the axis of rotation of hub 35, which moments are in opposition to the movement of tone arm 17 across the record face.

Figure 5:
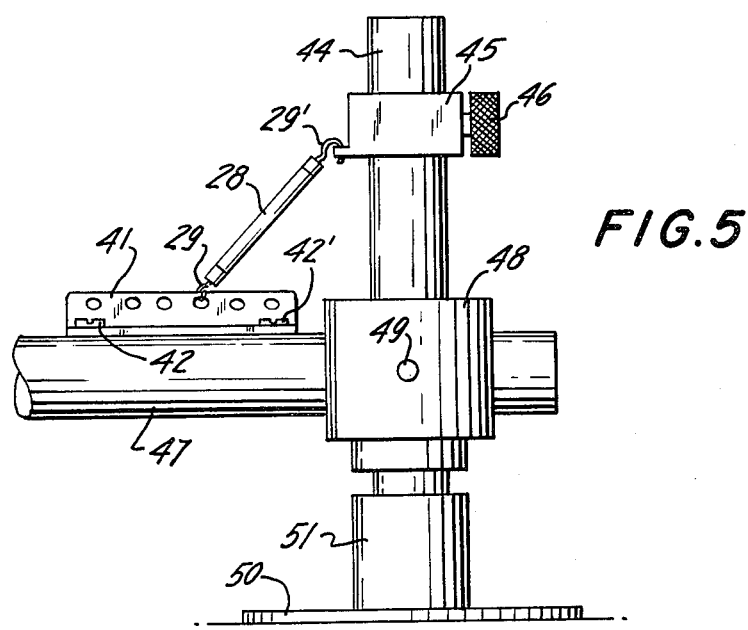
FIG. 5 is front elevation of a different embodiment of the suspension system of the present invention.
Figure 3:
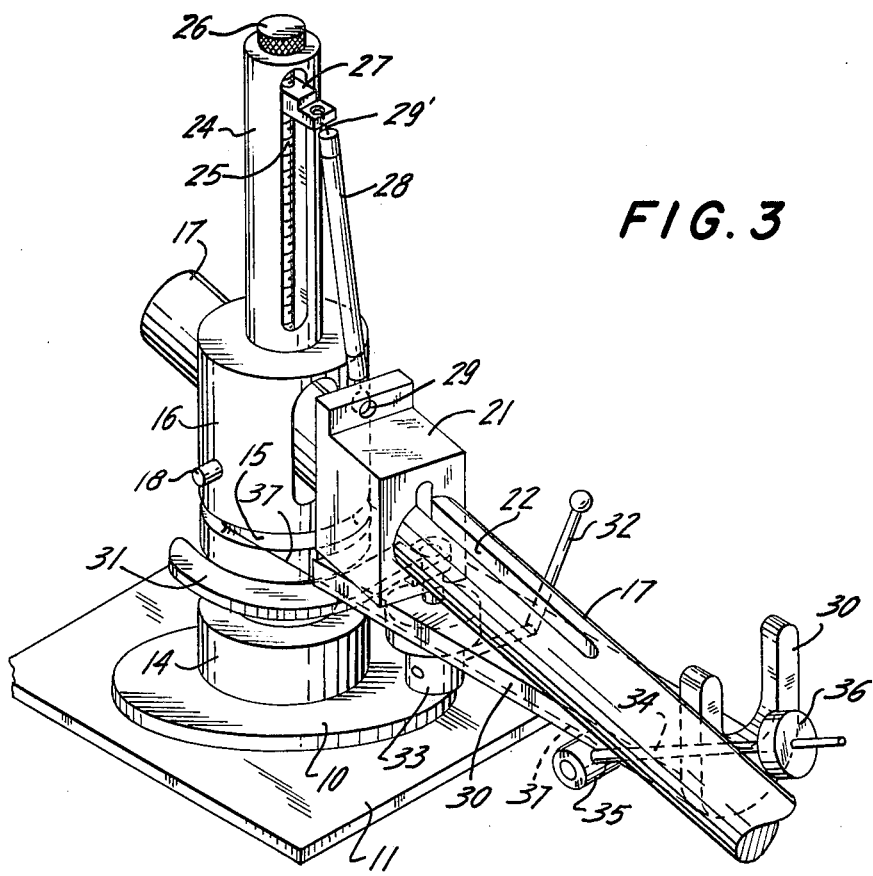
FIG. 3 is a prospective of the suspension system shown in FIG. 2.

The present invention may also be practiced in less sophisticated embodiments than those heretofore discussed. As shown in FIG. 5, for example, one or both of the support members may be operable to receive the resilient member at any one of a plurality of predetermined positions. In FIG. 5, for example, the first attachment means 41 is fixed to tone arm 47, as for example by fasteners 42 and 42' and is provided with a series of openings operable to engage hook 29 of resilient member 28. The second attachment means utilizes a column 44 along which can be positioned attachment collar 45. Attachment collar 45 in turn carries a tightening screw 46 in order to fix collar 45 at any desired position along the length of column 44. It would be apparent to those skilled in the art that the structure of the first and second attachment means can be reversed or that both could be identical; i.e. two plates such as first attachment means 41 or two collars such as attachment collar 45. In the embodiment shown in FIG. 5, the structure of yoke 48, pivot shaft 49 and support member 51 on base 50 can be of any conventional design.

Other structural modifications embodying the concept of the present invention will also be apparent to those skilled in the art. For example, substantially the same advantages can be realized by placing the first attachment means on the underside of that portion of the tone arm 17 extending behind shaft 18 and placing the second attachment means similarly below the tone arm, thereby achieving a levering effect. While this embodiment has the advantage of removing the support mechanism to a more protected location, it suffers from the disadvantage that the rear portion of the tone arm must be slightly extended and the entire yoke assembly raised in order to accommodate the second attachment means at a point below the path of the tone arm in pivoting about shaft 18.

What is claimed is:

1. A suspension system for a phonograph tone arm which is operable to carry a pick-up cartridge and is pivotably mounted on a base for rotational movement about vertical and horizontal axes, the system comprising (a) first attachment means mechanically linked to said tone arm and providing a plurality of attachment positions along a portion of a first line, each attachment position being operable upon application of a sufficient supporting force to counterbalance the rotational displacement under the influence of gravity of the tone arm within the plane of its rotational movement about its horizontal axis;

(b) second attachment means operable to provide a plurality of attachment positions along a portion of a second line which second line lies in said plane of the tone arms's rotation but is transverse to said first line;

(c) support means for said second attachment means; and (d) an elongated resilient member diagonally attached between said first and second attachment means for tensional support of said tone arm, the effective mechanical compliance exhibited by the resilient member with respect to rotational movement of the tone arm and any pick-up cartridge associated therewith being dependent upon the relative positions of said first and second attachment means on said first and second lines.

2. A suspension system according to claim 1 wherein the support member is disposed above the tone arm.

3. A suspension system according to claim 1 wherein the elongated resilient member is an elastomer.

4. A suspension system according to claim 3 wherein the elastomer is silicone rubber.

5. A suspension system according to claim 1 wherein said second attachment means comprise a screw rotatably mounted on said support member, a carriage threaded on said screw, and means operable to connect said second end of said resilient member to said cartridge.

6. A suspension system according to claim 5 wherein said first attachments comprises a collar riding on and positionally adjustable along a portion of said tone arm.

* * * * *